United States Patent
Griffin et al.

(10) Patent No.: US 10,223,372 B2
(45) Date of Patent: Mar. 5, 2019

(54) LOG SYNCHRONIZATION AMONG DISCRETE DEVICES IN A COMPUTER SYSTEM

(71) Applicant: International Business Machines Corporation, Armonk, NY (US)

(72) Inventors: Thomas J. Griffin, Salt Point, NY (US); Steven J. Hnatko, Fishkill, NY (US)

(73) Assignee: International Business Machines Corporation, Armonk, NY (US)

(*) Notice: Subject to any disclaimer, the term of this patent is extended or adjusted under 35 U.S.C. 154(b) by 233 days.

(21) Appl. No.: 15/006,751

(22) Filed: Jan. 26, 2016

(65) Prior Publication Data
US 2017/0212908 A1    Jul. 27, 2017

(51) Int. Cl.
G06F 17/30    (2006.01)

(52) U.S. Cl.
CPC .. G06F 17/30174 (2013.01); G06F 17/30144 (2013.01); G06F 17/30516 (2013.01); G06F 17/30581 (2013.01)

(58) Field of Classification Search
CPC ......... G06F 17/30144; G06F 17/30174; G06F 17/30; G06F 17/30581; G06F 17/30516; G06F 12/0868; G06F 11/30404; G06F 17/30557; G06F 17/30348; G06F 17/30575; G06F 11/30581; H04L 20/86; H04H 20/86
See application file for complete search history.

(56) References Cited

U.S. PATENT DOCUMENTS

| | | | |
|---|---|---|---|
| 5,924,096 A | 7/1999 | Draper et al. | |
| 6,065,018 A | 5/2000 | Beier et al. | |
| 6,976,197 B2 | 12/2005 | Faust et al. | |
| 7,080,160 B2 | 7/2006 | Cognet et al. | |
| 7,457,601 B2 | 11/2008 | Foltyn et al. | |
| 7,809,685 B2 | 10/2010 | Wolff | |
| 8,849,686 B2 | 9/2014 | Albisu et al. | |
| 9,842,053 B2 * | 12/2017 | Joshi | G06F 12/0804 |
| | | | 711/103 |
| 2006/0041656 A1 * | 2/2006 | Li | G06F 11/0727 |
| | | | 709/223 |
| 2008/0163005 A1 * | 7/2008 | Sonksen | G06F 11/221 |
| | | | 714/41 |
| 2008/0222734 A1 * | 9/2008 | Redlich | G06F 21/577 |
| | | | 726/26 |

(Continued)

OTHER PUBLICATIONS

Hensgen et al., "Two Algorithms for Barrier Synchronization", International Journal of Parallel Programming, vol. 17, No. 1, Feb. 1988, pp. 1-17, Kluwer Academic Publishers, Norwell, MA, USA.

(Continued)

*Primary Examiner* — Anh Ly
(74) *Attorney, Agent, or Firm* — Grant A. Johnson (57) ABSTRACT

Log synchronization among discrete devices in a computer system includes, periodically at a predefined interval: sending, by a host to each of a plurality of discrete devices in the computer system, a synchronization tag, wherein each of the discrete devices, responsive to receiving the synchronization tag from the host, is configured to record the synchronization tag in a log entry; and recording, by the host, the synchronization tag in a log entry.

18 Claims, 4 Drawing Sheets

(56) References Cited

U.S. PATENT DOCUMENTS

| | | | | |
|---|---|---|---|---|
| 2009/0313503 A1* | 12/2009 | Atluri | G06F 11/1453 | 714/19 |
| 2011/0267175 A1* | 11/2011 | Moshfeghi | H04L 47/10 | 340/10.1 |
| 2013/0227350 A1* | 8/2013 | O'Riordan | G06F 11/3476 | 714/45 |
| 2014/0063180 A1* | 3/2014 | Sharma | G08C 19/00 | 348/36 |
| 2014/0095554 A1 | 4/2014 | Thomeer et al. | | |
| 2014/0122430 A1* | 5/2014 | Dary | G06F 17/30309 | 707/624 |
| 2014/0281131 A1* | 9/2014 | Joshi | G06F 12/0804 | 711/103 |
| 2014/0281653 A1* | 9/2014 | Gilda | G06F 1/12 | 713/400 |
| 2014/0375422 A1* | 12/2014 | Huber | G07C 9/00174 | 340/5.61 |
| 2017/0212946 A1 | 7/2017 | Griffin et al. | | |

OTHER PUBLICATIONS

Zhou et al. "Performance Study of a Mobile Multi-hop 802.11 a/b Railway Network Using Passive Measurement", Mobile Networks and Applications Journal, vol. 14, No. 6, Dec. 2009, pp. 782-797, Kluwer Academic Publishers, Hingham, MA, USA.

Zhou et al. "OAMS: A Highly Reliable Metadata Service for Big Data Storage", 2013 IEEE 16th International Conference on Computational Science and Engineering (CSE), Dec. 2013, pp. 1287-1294, IEEE Xplore Digital Library, DOI: 10.1109/CSE.2013.191.

Dong et al. "Dynamic Logging With Dylog for Networked Embedded Systems", 2014 Eleventh Annual IEEE International Conference on Sensing, Communication, and Networking (SECON), Jun. 2014, pp. 381-389, IEEE Xplore Digital Library, DOI: 10.1109/SAHCN.2014.6990375.

Appendix P; List of IBM Patent or Applications Treated as Related, Mar. 1, 2016, 2 pages.

\* cited by examiner

LOG SYNCHRONIZATION AMONG DISCRETE DEVICES IN A COMPUTER SYSTEM

BACKGROUND OF THE INVENTION

Field of the Invention

The field of the invention is data processing, or, more specifically, methods, apparatus, and products for log synchronization among discrete devices in a computer system.

Description of Related Art

Computer systems today include many discrete devices. Examples of such devices may include one or more processors, computer memory, memory controllers, bus adapters, input/output adapters, I/O devices, I/O bridges, storage devices, and so on. Many of these devices generate log files which include time-stamped log entries. Such log entries are often analyzed to determine causes of failures in a computer system. Moreover, a failure in one device may cause log entries to be generated in other devices. As such, analysis of multiple log files may be useful to fully understand the cause and effects of failures or other events occurring in a computer system.

Each log files, however, may include many entries. In some instances log files may include hundreds of thousands of entries. Correlating log entries of one log file to another for purposes of analyzing a single event or failure may be difficult for a variety of reasons. The timestamps of a log entry in one log file for example may not correlate precisely with timestamps of log entries other log files even when such log entries were generated near the same time as or responsive the same event. As such, correlating multiple entries among multiple log files, each of which may include many entries, may be difficult.

SUMMARY

Methods, apparatus, and products for log synchronization among discrete devices in a computer system are disclosed in this specification. Such log synchronization may include, periodically at a predefined interval: sending, by a host to each of a plurality of discrete devices in the computer system, a synchronization tag, wherein each of the discrete devices, responsive to receiving the synchronization tag from the host, is configured to record the synchronization tag in a log entry; and recording, by the host, the synchronization tag in a log entry.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
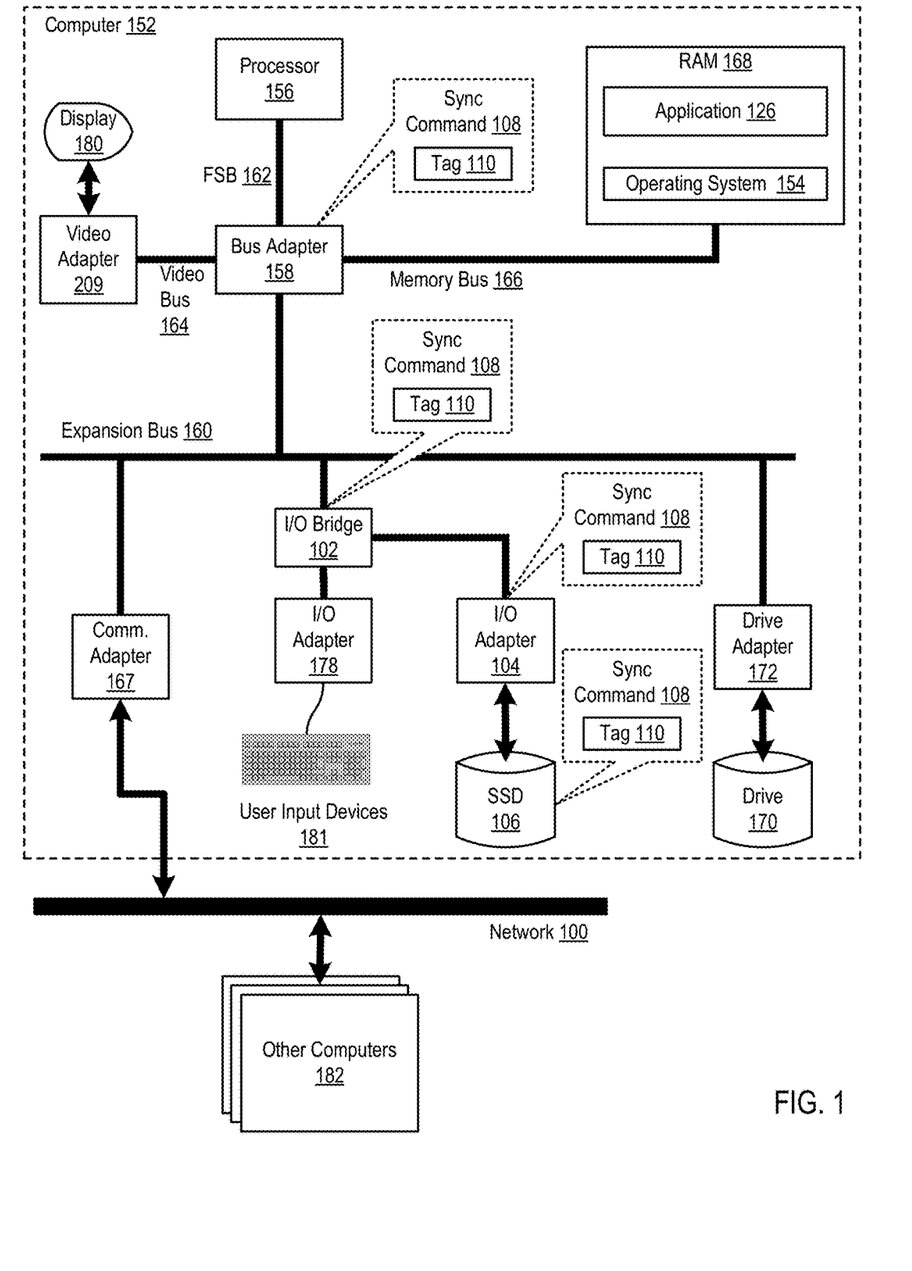
FIG. 1 sets forth a block diagram of an example system configured for log synchronization among discrete devices according to embodiments of the present invention.

Example methods, apparatus, and products for log synchronization among discrete devices in accordance with the present invention are described with reference to the accompanying drawings, beginning with FIG. 1. FIG. 1 sets forth a block diagram of an example system configured for log synchronization among discrete devices according to embodiments of the present invention. The system of FIG. 1 includes automated computing machinery comprising an example computer (152). The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is an application (126), a module of computer program instructions for user level data processing. Examples of such user level data processing applications include word processors, spreadsheet applications, media library and playback applications, database management applications, and so on as will occur to readers of skill in the art. Also stored in RAM (168) is an operating system (154). Operating systems useful in computers configured for log synchronization among discrete devices according to embodiments of the present invention include UNIX™, Linux™, Microsoft Windows™, AIX™, IBM's I™, mobile operating systems, and others as will occur to those of skill in the art. The operating system (154) and application (126) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers configured for log synchronization among discrete devices according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178, 104) coupled to the bus adapter (158) through an I/O bridge (102). An I/O bridge couples one independent bus to another independent bus. I/O adapters may implement user-oriented input/output through, for example, software drivers and computer hardware for controlling output to display devices such as computer display screens, as well as user input from user input devices (181) such as keyboards and mice. I/O adapters such as I/O adapter (104) may also implement I/O to and from various devices such as storage devices. In the example of FIG. 1, the I/O adapter (104) is coupled to a solid state drive (106).

The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for log synchronization among discrete devices according to embodiments of the present invention include modems for wired dial-up communications, Ethernet (IEEE 802.3) adapters for wired data communications, and 802.11 adapters for wireless data communications.

Each of the components described above—the bus adapter (158), I/O adapters (178, 104), the storage devices (106, 170), the drive adapter (172), the I/O bridge (102), and the like—are discrete devices of the computer system. Each of the discrete devices may generate log files with many timestamped log entries. To that end, the example computer (152) of FIG. 1 may be configured for log synchronization in accordance with various embodiments of the present disclosure.

A 'host' may be configured in the computer system (152) of FIG. 1 to carry out the log synchronization techniques of the present disclosure. Such a host may be implemented as an operating system (154), as a bus adapter (158), as a memory controller, a processor (156), a hypervisor and so on as will occur to readers of skill in the art.

To effect log synchronization techniques in accordance with embodiments of the present invention, such a host—the bus adapter (158) for example—may periodically at a predefined interval: send, to each of a plurality of discrete devices in the computer system, a synchronization tag (110). A synchronization tag may be implemented as a predesignated value. The synchronization tag may be sent to each of the discrete components (such as the IO bridge (102), the I/O adapter (104), and the SSD (106)), by way of a sync command (108).

Each of the discrete devices, responsive to receiving the synchronization tag (110) from the host (158) may record the synchronization tag in a log entry. The host, (158) may also record the synchronization tag in a log entry of its own log. In this way, each of the log files of the discrete components is ensured to have a matching value in a log entry. For purposes of log file analysis the logs may be compared and the value of log entry holding the synchronization tag may be correlated. Each synchronization tag may be of a different value than the previous synchronization tag.

Also, rather than sending the synchronization tag (110) to each of the discrete components directly, the host may 'send' the synchronization tag by way of propagation. That is, one of the discrete devices, responsive to receiving the synchronization tag, may propagate the synchronization tag (or command including the tag) to downstream devices. In the example of FIG. 1, the bus adapter (158) in its role as host may send a synchronization command (108) with the synchronization tag (110) to the I/O bridge (102). The I/O bridge may then record the synchronization tag (110) in its own log file and propagate the command to a downstream device such as the I/O adapter (104). The I/O adapter may record the synchronization tag (110) in its own log file and again propagate the command to another downstream device, the SSD (106), which in turn, records the synchronization tag in its own log file.

The host may send such synchronization tags at a predefined, programmable interval. In debug or testing environments, for example, a higher frequency of such synchronization tags may be useful for log analysis. In a production environment, a lower frequency may be preferred both to reduce data communications traffic on bus lines and to reduce the amount of entries generated in a log file. Discrete devices may have very different available space for log files. As such, reducing the frequency the synchronization tag propagation may ensure that space available for log files is not over-utilized by synchronization tags.

The arrangement of devices making up the example system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
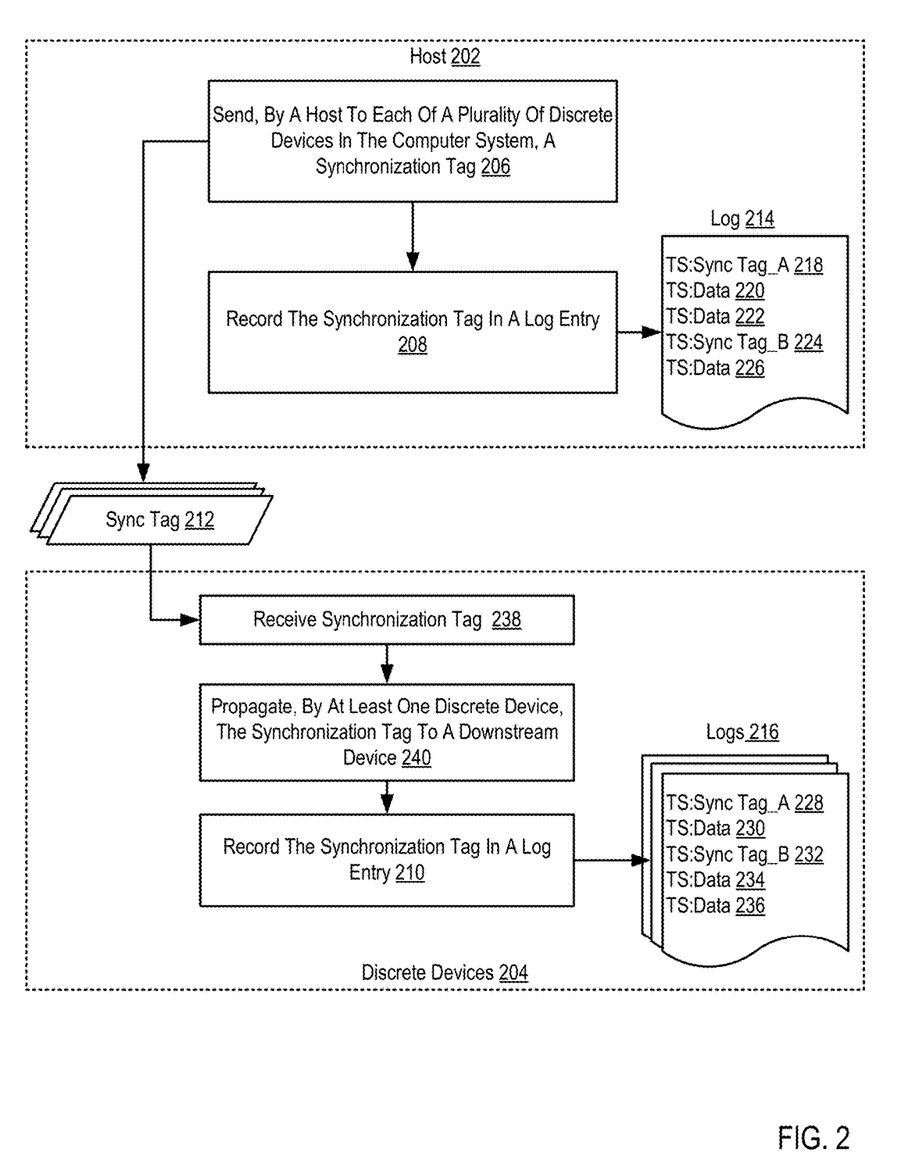
FIG. 2 sets forth a flow chart illustrating an example method for log synchronization among discrete devices according to embodiments of the present invention.

For further explanation, FIG. 2 sets forth a flow chart illustrating an example method for log synchronization among discrete devices according to embodiments of the present invention. The method of FIG. 2 may be carried out periodically at a predefined interval. The method of FIG. 2 includes sending (206), by a host (202) to each of a plurality of discrete devices (204) in the computer system, a synchronization tag (212). Sending (206) such a synchronization tag (212) may be carried out in a variety of ways including issuing a synchronization command to a device downstream from the host, where the command includes as a parameter, the synchronization tag.

The method of FIG. 2 also includes recording (208), by the host, the synchronization tag (212) in a log entry. Recording (208) the synchronization tag in the log entry includes creating a timestamped entry in the log and storing as a value of the entry, the synchronization tag. In the example of FIG. 2, the host (202) has generated a log file (214) with many timestamped ('TS') log entries (218, 220, 222, 224, 226). Log entry (218) includes a first synchronization tag ('Tag_A') and log entry (224) includes a second synchronization tag ('Tag_B').

The method of FIG. 2 also includes receiving (238), by the discrete devices (204), the synchronization tag (212). In the method of FIG. 2, at least one of the discrete devices (204) may be configured to propagate (240) the synchronization tag to a downstream device (another discrete device of the computer system).

In the method of FIG. 2, each of the discrete devices (204), responsive to receiving (238) the synchronization tag (212) from the host (202), records (210) the synchronization tag in a log entry. In the example of FIG. 2, one of the logs (216) of the discrete devices includes many entries (228, 230, 232, 234, 236). Log entry (228) includes the first synchronization tag and log entry (232) includes the second synchronization tag. Readers of skill in the art will recognize that in many embodiments, the entries of the logs (216), other than the entry containing the synchronization tag, will not match the entries of the host log.

Figure 3:
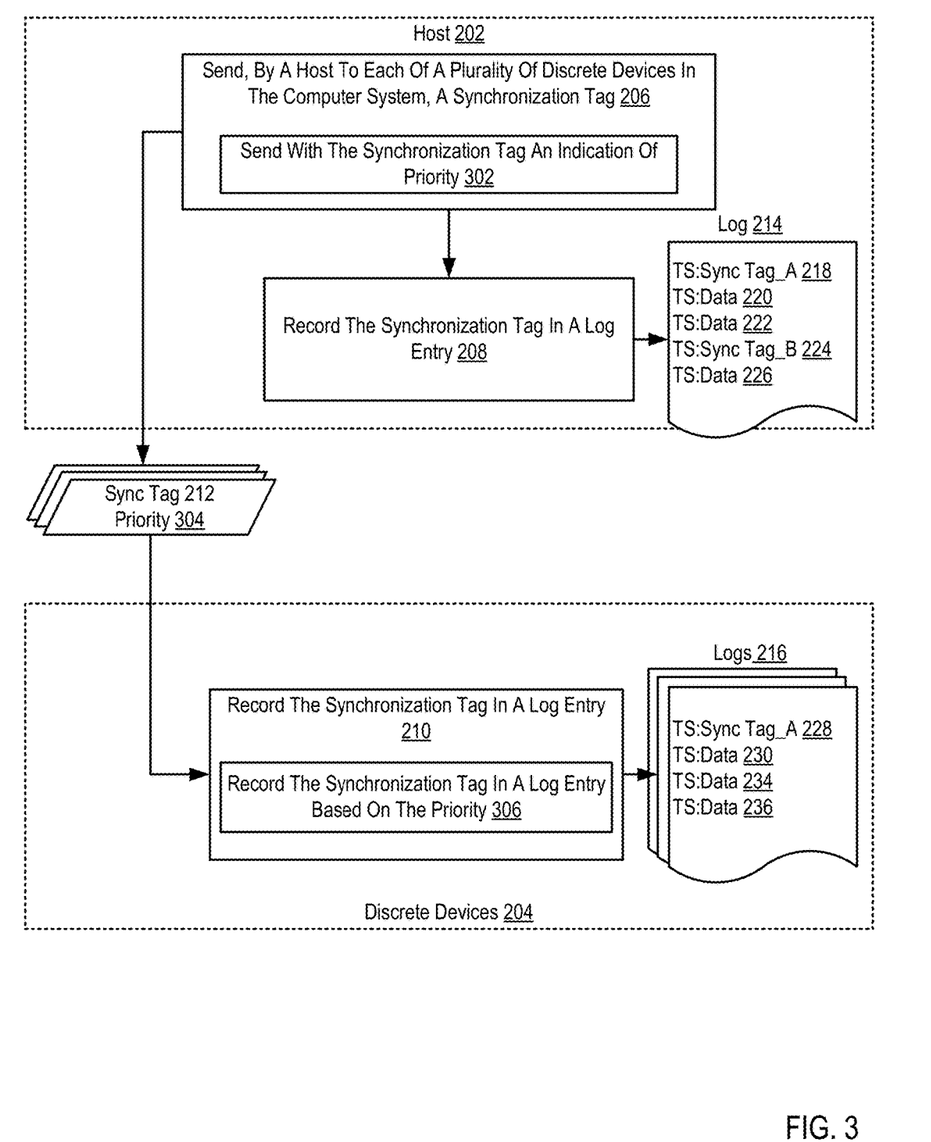
FIG. 3 sets forth a flow chart illustrating another example method for log synchronization among discrete devices according to embodiments of the present invention.

For further explanation, FIG. 3 sets forth a flow chart illustrating another example method for log synchronization among discrete devices according to embodiments of the present invention. The method of FIG. 3 is similar to the method of FIG. 2 in that the method of FIG. 3 also includes, periodically at a predefined interval: sending (206), by a host to each of a plurality of discrete devices in the computer system, a synchronization tag; recording (208), by the host, the synchronization tag in a log entry; and recording (210), by the discrete devices, the synchronization tag in a log entry.

The method of FIG. 3 differs from the method of FIG. 2, however, in that in the method of FIG. 3 sending (206) the synchronization tag to each of the plurality of discrete devices also includes sending (302) with the synchronization tag an indication of priority. An indication of priority may be implemented in variety of ways. In one example, an indication of priority may be in one of two states: 'high' or 'low.'

Also in the method of FIG. 3, recording (210), by the discrete devices, the synchronization tag includes recording (306) the synchronization tag in a log entry based on the priority of the synchronization tag. That is, in some embodiments, one or more discrete devices may be configured to store only the high priority synchronization tags in a log entry.

In this way, discrete devices will little available memory for log files may be configured to store only high priority synchronization tags and effectively—reducing the number of log entries in the device's log file. In some embodiments, the host may be configured to send out only low priority synchronization tags, while in other embodiments, the host may send both high and low synchronization tags at various frequencies.

Figure 4:
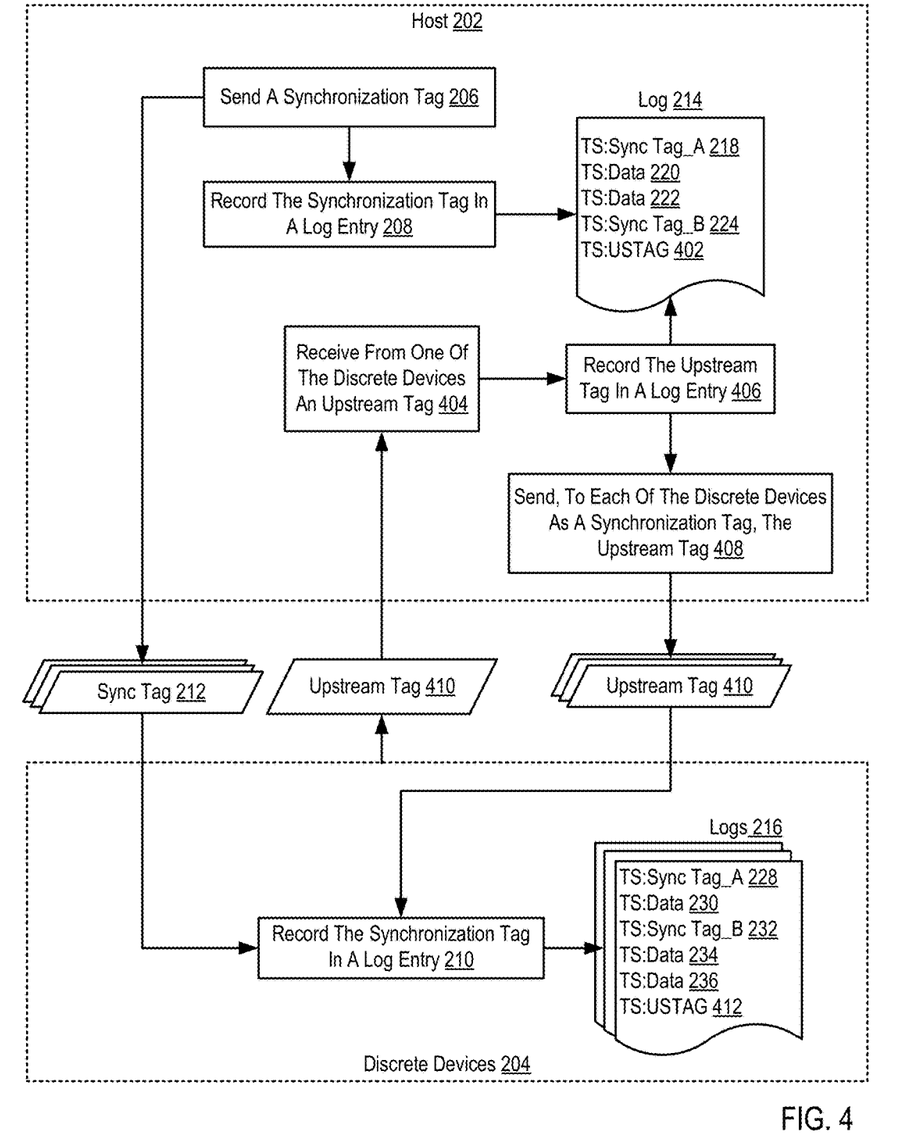
FIG. 4 sets forth a flow chart illustrating another example method for log synchronization among discrete devices according to embodiments of the present invention.

For further explanation, FIG. 4 sets forth a flow chart illustrating another example method for log synchronization among discrete devices according to embodiments of the present invention. The method of FIG. 4 is similar to the method of FIG. 2 in that the method of FIG. 4 also includes, periodically at a predefined interval: sending (206), by a host to each of a plurality of discrete devices in the computer system, a synchronization tag; recording (208), by the host, the synchronization tag in a log entry; and recording (210), by the discrete devices, the synchronization tag in a log entry.

The method of FIG. 4 differs from the method of FIG. 2, however, in that the method of FIG. 4 also includes receiving (404), by the host (202), from one of the discrete devices (204), an upstream tag (410). An 'upstream tag' as the term is used here refers to a synchronization tag that is propagated upstream rather than downstream. The method of FIG. 4 continues by the host recording (406) the upstream tag (408) in a log entry (402). In some embodiments, the upstream tag may be event driven. That is, a discrete device may be programmed to generate an upstream tag upon an occurrence of a particular event. In some embodiments, the upstream tag may be sent to the host periodically at a predefined interval.

In some embodiments, the upstream tag (410) may also be sent (408), by the host (202) to each of the discrete devices (204) as a synchronization tag responsive to the host receiving (404) the upstream tag. In this way, a downstream discrete device may send an upstream tag to prompt the generation of a synchronization tag in all discrete devices, upstream or down relative to the discrete device that sent the upstream tag. Each discrete device may record the upstream tag in a similar manner as the devices record (210) the synchronization tag. From the discrete device's point of view, the upstream tag is, in fact, a synchronization tag provided to the discrete device from the host. In the example of FIG. 4 the log (216) includes an entry (412) that includes the upstream tag.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. An apparatus for log synchronization among discrete devices, the apparatus comprising a computer processor, a computer memory operatively coupled to the computer processor, the computer memory storing computer program instructions that, when executed by the computer processor, cause the apparatus to carry out:
periodically at a predefined interval:
sending, by a host to each of a plurality of discrete devices in the computer system, a synchronization tag, including directing each of the discrete devices, to record the synchronization tag in a log entry of each of the plurality of discrete devices; and
recording, by the host, the synchronization tag in a log entry of the host, wherein by sending each of the plurality of discrete devices the synchronization tag and by recording the synchronization tag in the log entry, the host and each of the plurality of discrete devices is ensured to have a matching log entry.

2. The apparatus of claim 1 wherein the predefined interval is programmable.

3. The apparatus of claim 1 wherein the host comprises an operating system.

4. The apparatus of claim 1 wherein the host comprises a bus adapter.

5. The apparatus of claim 1 wherein sending the synchronization tag to each of the plurality of discrete devices further comprises sending with the synchronization tag an indication of priority, wherein each discrete device is further configured to record the synchronization tag in a log entry based on the priority of the synchronization tag.

6. The apparatus of claim 1 further comprising computer program instructions that, when executed by the computer processor, cause the apparatus to carry out:
receiving, by the host, from one of the discrete devices, an upstream tag; and
recording by the host the upstream tag in a log entry.

7. The apparatus of claim 1, wherein at least one of the discrete devices propagates the synchronization tag to a downstream device responsive to receiving the synchronization tag.

8. A computer program product for log synchronization among discrete devices, the computer program product disposed upon a non-transitory computer readable medium, the computer program product comprising computer program instructions that, when executed, cause a computer to carry out:
periodically at a predefined interval:
sending, by a host to each of a plurality of discrete devices in the computer system, a synchronization tag, including directing each of the discrete devices, to record the synchronization tag in a log entry of each of the plurality of discrete devices; and recording, by the host, the synchronization tag in a log entry of the host, wherein by sending each of the plurality of discrete devices the synchronization tag and by recording the synchronization tag in the log entry, the host and each of the plurality of discrete devices is ensured to have a matching log entry.

9. The computer program product of claim 8 wherein the predefined interval is programmable.

10. The computer program product of claim 8 wherein sending the synchronization tag to each of the plurality of discrete devices further comprises sending with the synchronization tag an indication of priority, wherein each discrete device is further configured to record the synchronization tag in a log entry based on the priority of the synchronization tag.

11. The computer program product of claim 8 further comprising computer program instructions that, when executed, cause the computer to carry out:
   receiving, by the host, from one of the discrete devices, an upstream tag; and
   recording by the host the upstream tag in a log entry.

12. The computer program product of claim 8, wherein at least one of the discrete devices propagates the synchronization tag to a downstream device responsive to receiving the synchronization tag.

13. An apparatus for log synchronization among discrete devices, the apparatus comprising a computer processor, a computer memory operatively coupled to the computer processor, the computer memory storing computer program instructions that, when executed by the computer processor, cause the apparatus to carry out:
   periodically at a predefined interval:
      sending, by a host to each of a plurality of discrete devices in the computer system, a synchronization tag, including directing each of the discrete devices, to record the synchronization tag in a log entry of each of the plurality of discrete devices, wherein each discrete device is configured to record the synchronization tag in a log entry based on a priority of the synchronization tag, and wherein at least one of the discrete devices propagates the synchronization tag to a downstream device responsive to receiving the synchronization tag; and
   recording, by the host, the synchronization tag in a log entry of the host, wherein by sending each of the plurality of discrete devices the synchronization tag and by recording the synchronization tag in the log entry, the host and each of the plurality of discrete devices is ensured to have a matching log entry.

14. The apparatus of claim 13 wherein the predefined interval is programmable.

15. The apparatus of claim 13 wherein the host comprises an operating system.

16. The apparatus of claim 13 wherein the host comprises a bus adapter.

17. The apparatus of claim 13 wherein sending the synchronization tag to each of the plurality of discrete devices further comprises sending with the synchronization tag an indication of priority.

18. The apparatus of claim 13 further comprising computer program instructions that, when executed by the computer processor, cause the apparatus to carry out:
   receiving, by the host, from one of the discrete devices, an upstream tag; and
   recording by the host the upstream tag in a log entry.

* * * * *